Jan. 22, 1952    M. P. LAURENT    2,582,996
SEAL FOR GATE VALVE BONNETS
Filed March 2, 1945

INVENTOR.
MILTON P. LAURENT
BY Lester B. Clark
+ Ray L. Smith
ATTORNEYS

Patented Jan. 22, 1952

2,582,996

UNITED STATES PATENT OFFICE 2,582,996

SEAL FOR GATE VALVE BONNETS

Milton P. Laurent, Houston, Tex.

Application March 2, 1945, Serial No. 580,552

1 Claim. (Cl. 251—62)

The invention relates to a seal for valve bonnets or caps which close the valve chamber.

In the usual type of valve, the body is provided with a chamber to receive the valve member and after the insertion of the valve member, a cap or bonnet is bolted or threaded onto the valve body so as to retain the valve member and to form a seal about the valve stem.

It has been found in practice, particularly with higher pressure valves, that the threaded engagement of the bonnet or cap is unsatisfactory and such higher pressure valves are therefore equipped with a large number of bolts or studs by which the bonnet or cap is affixed. Such a structure is expensive and difficult to manufacture, requires skill in assemblying to maintain proper alignment and is always the weakest point of all higher pressure valves.

The present invention therefore contemplates an improvement in providing a simple and economical connection for the bonnet or cap to the valve body with greater safety factor and less weight of material used.

It is one of the objects of the invention to provide a wedging seal between the body and a closure for the valve chamber which is so arranged that when the closure member is moved outwardly, either by an external force or the pressure on the inside of the valve, that the wedging and sealing action will be increased and maintained.

Another object of the invention is to provide a sealing assembly including an inclined wall on the inside of the valve body and a tapered face on a closure member so that a seal ring spaced between the two will be held in sealing position by movement of one of the members relative to the other.

Another object of the invention is to provide a seal ring having inner and outer tapered surfaces which are of different inclinations with respect to the axis of the ring so that the ring may be wedged into position by movement of a member which engages the face having the lesser inclination.

Still another object of the invention is to provide a valve assembly wherein a closure is sealed in the body by a seal ring which is wedged in position by movement of the closure of the body.

Still another object of the invention is to provide a valve bonnet which is sealed to the valve body by wedging a ring between the bonnet and the inside of the body.

A still further object of the invention is to provide a valve bonnet assembly comprising, a closure and a cap whereby the closure may be wedged in the body by means of the cap and a seal ring.

Another object of the invention is to provide a combination gate valve bonnet and gate member assembly which may be inserted in the valve body and wedged into closing and sealing position.

Other and further objects of the invention will be readily apparent when the following description is considered in connection with the accompanying drawing, wherein.

Figures 1, 2:
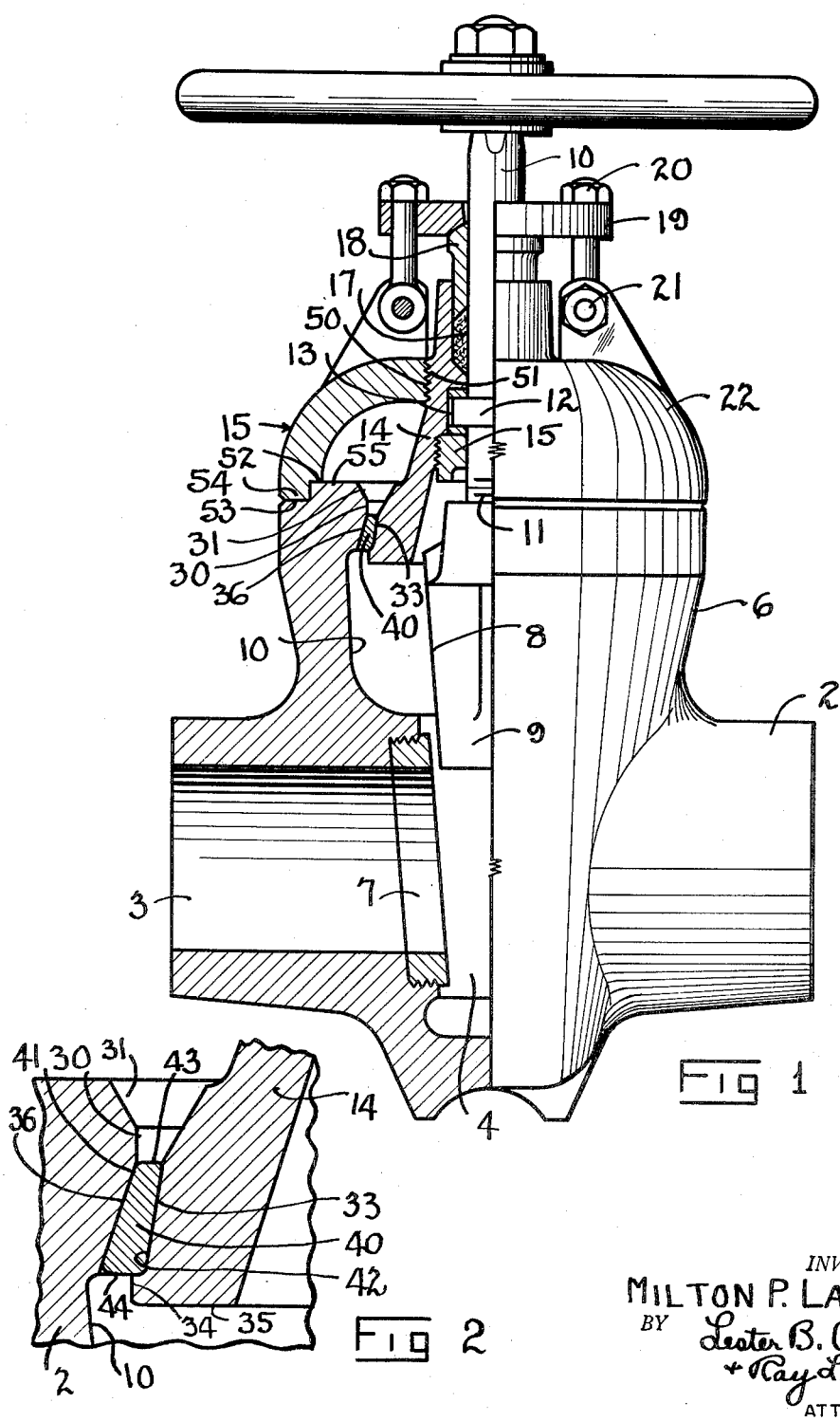
Fig. 1 is a side elevation of a valve equipped with the invention and showing certain portions in section.
Fig. 2 is a broken detail enlarged sectional view of the sealing connection.

The present invention relates generally to the invention disclosed in my prior copending application Serial Number 493,673, filed July 6, 1943, for Closure Joint, and is a continuation in part thereof.

In Fig. 1, the valve body 2 includes a structure having a flow passage 3 therethrough which is interrupted by a valve chamber 4 which is enlarged at 5 in the upper portion 6 of the body. A valve seat 7 is arranged in the flow passage 3 at each side of the chamber 4 so as to provide a seating face for the surfaces 8 on a gate member 9.

The gate member 9 is arranged for movement by rotation of a valve stem 10 which is threaded at 11 into the gate member.

The stem in turn is held against axial movement by a flange 12 arranged in a recess 13 in a closure member 14 by means of a bushing 15 which is threaded into such closure member. A stuffing box or packing 17 is held into position by a gland 18 forced in place by a collar 19 and the swing bolts 20 which bolts are pivoted at 21 on a cap 22.

This entire bonnet assembly 25 is insertable and removable relative to the body either as a unit or the closure member 14, the gate member 9, and the stem 10 can be inserted in the body and then the cap 22 later applied.

It is important that a seal be maintained between the body 2 and the closure member 14 so as to withstand the internal pressure applied to the valve due to the flow of fluid through the flow passage 3. In order to provide such a seal, it will be seen that the closure member 14 is generally in the form of a frusto-conical member whose external diameter or periphery is such that it will pass through the neck 30 of the opening 31 in the upper portion 6 of the valve body. This closure member 14 is provided with a tapered surface 33 which terminates in an enlarged shoulder 34 adjacent the base 35. The opening 31 has a wall 36 inclined inwardly into the upper portion 10 of the chamber. It will be particularly noted that the surface 33 on the closure member and the wall 36 on the body member are inclined with respect to their common vertical axis; that these two surfaces if projected converge together so that the lesser taper is shown as being present on the closure member.

These two surfaces 33 and 36 are spaced apart radially so as to provide a space or opening to receive the seal ring 40. This seal ring is of the type and configuration disclosed in my prior copending application and is preferably of a non-pliable resilient material. This ring has an inclined outer surface 41 which is of the same inclination as the wall 36 of the body while the inner surface 42 is of the same inclination as the surface 33 on the closure 14. Due to the fact that these two surfaces converge outwardly, the outer end 43 of the ring 40 will be narrower or thinner than the inner end 44. This arrangement is of such specific design so that the pressure inside the valve exerted against this face 44 will tend to move the ring outwardly and wedge it between the converging faces 33 and 36.

In order to insure that the seal ring 40 will be securely mounted on the closure, the outstanding shoulder 34 has been provided to abut the inside portion of the inner end face 44.

In operation and assembly of this structure, the gate 9, stem 10, and closure 14 will be inserted in the chamber 4 so that the face 33 of the closure member is downwardly below the wall 36.

The seal ring 40 may then be inserted by applying pressure on opposite sides thereof or at the ends of a diameter so as to give it a slightly elliptical form to permit its insertion through the neck 30. The ring is then moved around to a position on the face 33 but not necessarily seated against the shoulder 34. The closure member is then moved outwardly above the chamber until the face 41 moves against the wall 36 of the body.

The tapers of the closure, the wall, and the ring are such that an outward pull on the closure will cause the ring to seat against the wall 36. The cap member 22 can now be threaded into position by having the threads 50 thereon engage the threads 51 on the closure. The base of the cap is provided with a cut-out area 52 to seat on the shoulder 53 on the body. Rotation of the cap 22 will obviously move the closure member 14 outwardly of the chamber. The relative inclinations of the faces 33 and 36 now come into action and because of the fact that the surfaces 33 has a lesser inclination, the closure member will tend to slide through the seal ring 40 and to force it against the wall 36 which has the greater taper. This action is accomplished due to the fact that the lesser the taper between the two surfaces, the greater will be the mechanical advantage obtained upon movement of one member relative to the other, the greater mechanical advantage being between the surfaces 33 and 42. The ring 40 will tend to move along with the closure member gradually wedging itself against the wall 36 to form a seal, The ring 40 will be caused to move with the closure member when it seats against the shoulder 34.

It has been found in actual practice that such a tremendous pressure can be obtained by this wedging action, that in some conditions it is necessary to provide a downwardly extending lip 54 on the cap 22 so as to assist in reinforcing or confining the upper edge 55 of the body portion 6 of the valve.

After the desired seal has been obtained, the packing 17, gland 18, and bolts 20 can be arranged to form a seal about the valve stem.

A particular advantage of this construction is that in actual operation, when pressure is applied inside of the valve, such pressure will be exerted internally against the closure on the one hand and against the inner end 44 of the seal ring on the other hand. Thus any variation in the size of the parts due to expansion or contraction and fluctuation in pressure will be compensated for by equivalent movement of the closure and the ring, and it will be unnecessary to attend the valve to periodically adjust it to maintain a seal because the seal is automatically formed as a function of the internal pressure.

A valve constructed in accordance with the present invention will have a self sealing bonnet where the seal is automatic because of the constant ratio between the fluid pressure in the valve and the seating pressure of the closure. The area for maintaining the seat is predetermined and is not lessened under greater pressures, but is such that there is less area used of the valve bonnet which is exposed to pressure than is present in the conventional types of valves.

The valve can be constructed with less material and of less weight with far fewer parts to assemble and disassemble. The closure, ring and seats are so arranged that there will be automatic alignment of the parts when subjected to pressure but yet there is no permanent deformation of the seal ring because of the uniform application of pressure to the seat closure and seal. All of the sealing surfaces are outside of the area exposed to corrosion, wear and damage.

The sealing areas may be readily inspected as the valve is assembled and the joint will relax as a function of the applied internal pressure.

Broadly the invention contemplates a valve bonnet having no attaching bolts so that the valve may be readily assembled and dismantled and wherein a seal with the valve body is maintained as a function of the internal pressure.

What is claimed is:

A gate valve comprising a hollow body, having an open end, a tapered seat in said end opening, the outer end of the seat being of a smaller diameter than is the inner end, a closure assembly for said body comprising a hollow plug, an outwardly converging peripheral surface on said plug, the said plug being of somewhat smaller diameter than is the open end of said body and insertable through said open end, a gate stem rotatably mounted in said plug, a gate on said stem, a packing in said plug to seal with said stem, a seal between said plug surface and said body seat comprising, a tapered wedge ring also insertable through said opening to seal on said plug and in said seat, a shoulder on said plug below said ring to engage said ring, and a cap engaging said body and threaded on said plug to pull the plug and ring into said seat to seal said body.

MILTON P. LAURENT.

REFERENCES CITED

The following references are of record in the file of this patent:

UNITED STATES PATENTS

| Number | Name | Date |
|---|---|---|
| 611,442 | Vaughan | Sept. 27, 1898 |
| 724,939 | Reis | Apr. 7, 1903 |
| 2,305,589 | Stark | Dec. 22, 1942 |
| 2,305,590 | Marburg | Dec. 22, 1942 |
| 2,321,597 | Hobbs | June 15, 1943 |

FOREIGN PATENTS

| Number | Country | Date |
|---|---|---|
| 3,143 | Great Britain | of 1891 |